United States Patent
Heeter et al.

(10) Patent No.: US 9,426,203 B2
(45) Date of Patent: Aug. 23, 2016

(54) REMOTE APPLICATION CONTROL INTERFACE

(71) Applicant: MICROSOFT CORPORATION, Redmond, WA (US)

(72) Inventors: Ross David Heeter, Seattle, WA (US); Jason Robert Tuck, Kirkland, WA (US); Cyrus Kanga, Redmond, WA (US); Anthony Joseph Giardini, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 219 days.

(21) Appl. No.: 14/317,938

(22) Filed: Jun. 27, 2014

(65) Prior Publication Data

US 2015/0381702 A1 Dec. 31, 2015

(51) Int. Cl.
*G06F 3/00* (2006.01)
*H04L 29/08* (2006.01)
*G06F 3/0484* (2013.01)
*G06F 3/0482* (2013.01)
*H04L 29/06* (2006.01)

(52) U.S. Cl.
CPC ........... *H04L 67/025* (2013.01); *G06F 3/0482* (2013.01); *G06F 3/04842* (2013.01); *H04L 65/4084* (2013.01); *H04L 65/4092* (2013.01)

(58) Field of Classification Search
CPC .................................................... H04L 67/025
USPC ........................................................ 715/716
See application file for complete search history.

(56) References Cited

U.S. PATENT DOCUMENTS

| | | | | |
|---|---|---|---|---|
| 8,296,357 B2* | 10/2012 | Stone | ...................... | G06F 9/547 709/203 |
| 8,504,654 B1* | 8/2013 | Kominac | ................ | H04L 67/08 709/217 |
| 8,504,938 B2 | 8/2013 | Vaughan et al. | | |
| 8,555,315 B2 | 10/2013 | Woods et al. | | |
| 8,589,800 B2* | 11/2013 | Kominac | ................ | H04L 67/02 715/719 |
| 8,724,600 B2* | 5/2014 | Ramsay | ............ | G06F 17/30017 370/236 |
| 8,775,850 B2* | 7/2014 | Moy | ...................... | G06F 3/1423 455/556.2 |
| 8,819,255 B1* | 8/2014 | Harrison | ................ | H04L 67/42 709/229 |
| 8,825,871 B2* | 9/2014 | Baum | ................ | H04N 21/2187 340/531 |
| 8,966,376 B2* | 2/2015 | Kominac | .......... | G06F 17/30905 709/217 |
| 2004/0077347 A1* | 4/2004 | Lauber | ................ | G08G 1/0962 455/428 |
| 2005/0246469 A1* | 11/2005 | Chu | ......................... | G06F 1/12 710/301 |

(Continued)

OTHER PUBLICATIONS

Lin, et al., "Content-aware Smart Remote Control for Android-based TV", In IEEE International Conference on Consumer Electronics, Jan. 13, 2014, pp. 678-679.

(Continued)

*Primary Examiner* — William Titcomb
(74) *Attorney, Agent, or Firm* — Aaron Chatterjee; Judy Lee; Micky Minhas

(57) ABSTRACT

Embodiments of the present invention provide an active-application interface on a companion device that allows a user to control an application running on a primary device. The active-application interface may describe state information for a plurality of applications running on the primary device and allow the user to manipulate the application through one or more contextual controls. The active-application interface may be used to control applications running out-of-control focus on the primary device, including applications that do not presently have a visible viewport.

20 Claims, 12 Drawing Sheets

(56) References Cited

U.S. PATENT DOCUMENTS

| | | | |
|---|---|---|---|
| 2007/0132733 A1* | 6/2007 | Ram | G06F 3/0227 345/163 |
| 2009/0271812 A1* | 10/2009 | Root | G06F 17/30035 725/10 |
| 2009/0319894 A1* | 12/2009 | Markiewicz | G06F 3/04883 715/702 |
| 2011/0231872 A1 | 9/2011 | Gharachorloo et al. | |
| 2012/0089921 A1* | 4/2012 | Bellini | G06F 3/002 715/740 |
| 2012/0096503 A1* | 4/2012 | Slothouber | H04N 21/4126 725/110 |
| 2012/0162536 A1 | 6/2012 | Sibilsky et al. | |
| 2012/0216152 A1 | 8/2012 | Li | |
| 2012/0274863 A1 | 11/2012 | Chardon et al. | |
| 2013/0007217 A1* | 1/2013 | Jhang | H04L 69/03 709/219 |
| 2013/0205212 A1 | 8/2013 | Sinha et al. | |

OTHER PUBLICATIONS

"Logitech Harmony Smart Control" Published on: Apr. 26, 2013 Available at: http://www.logitech.com/en-gb/product/harmony-smart-control.

* cited by examiner

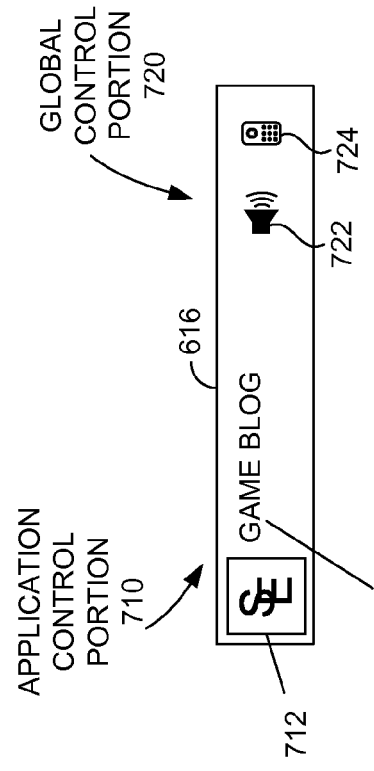
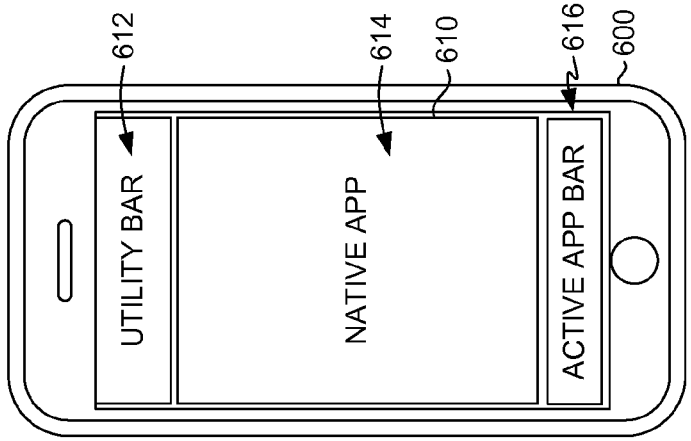
FIG. 7.
FIG. 6.

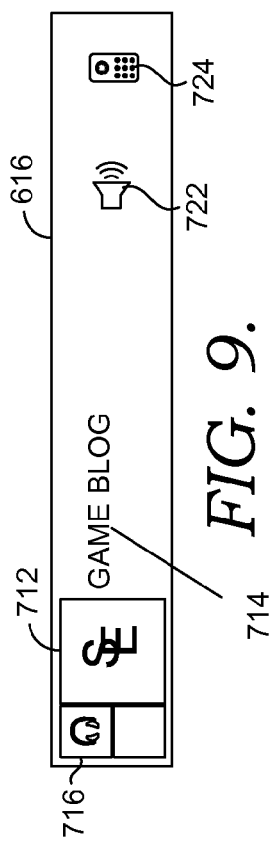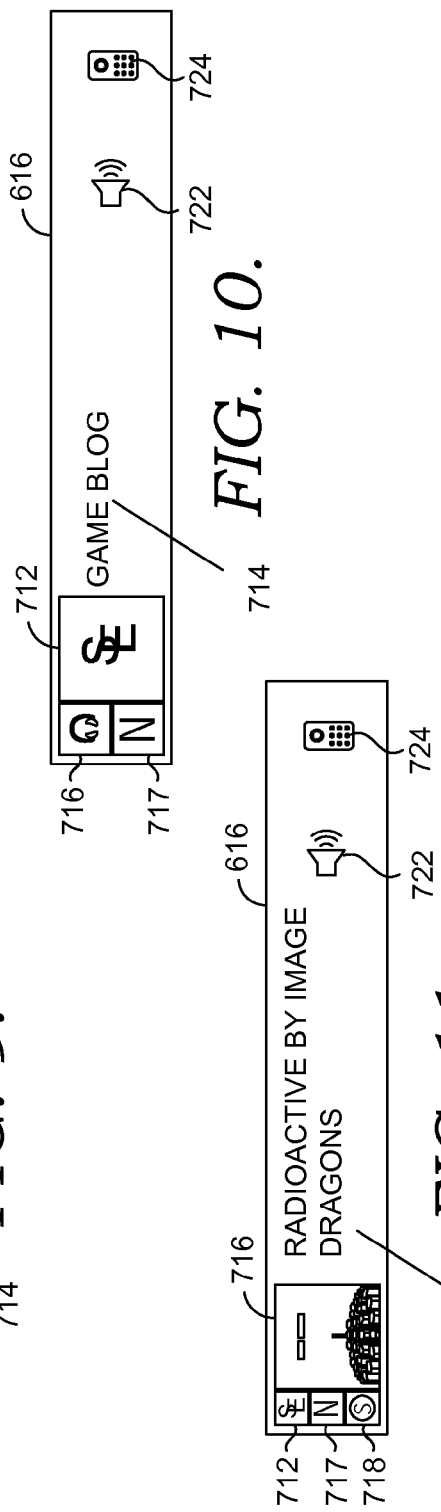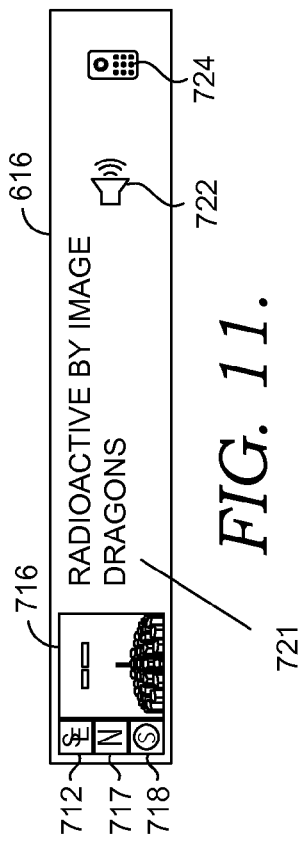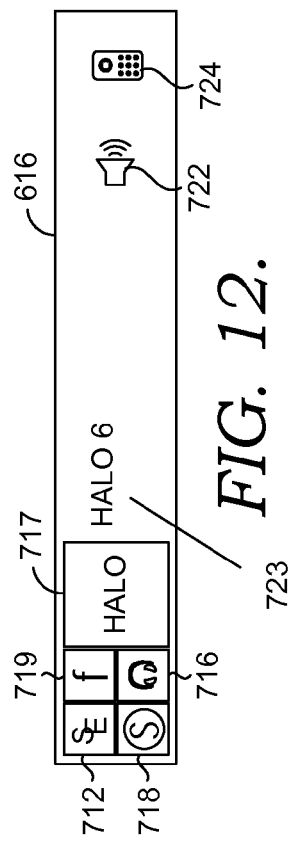

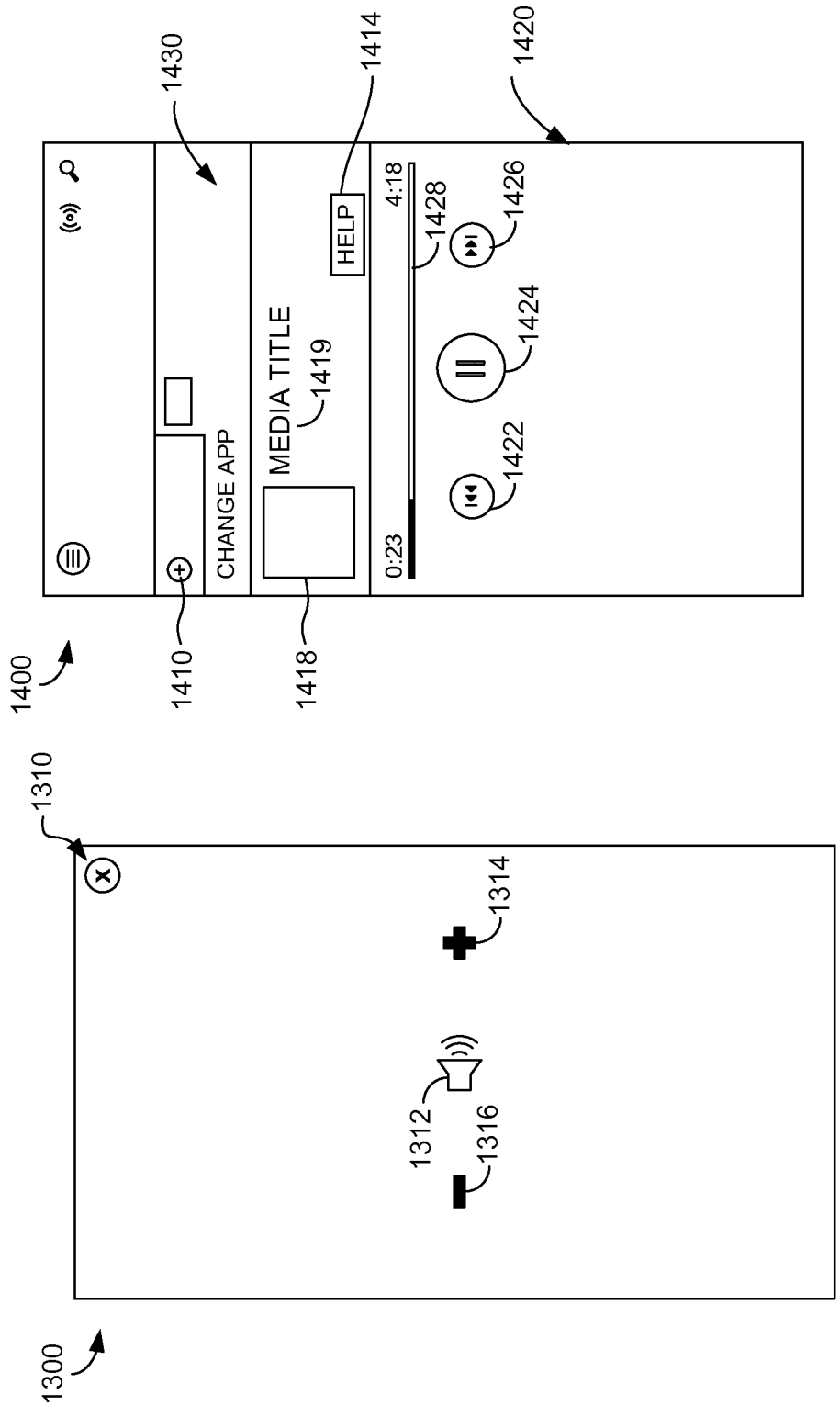

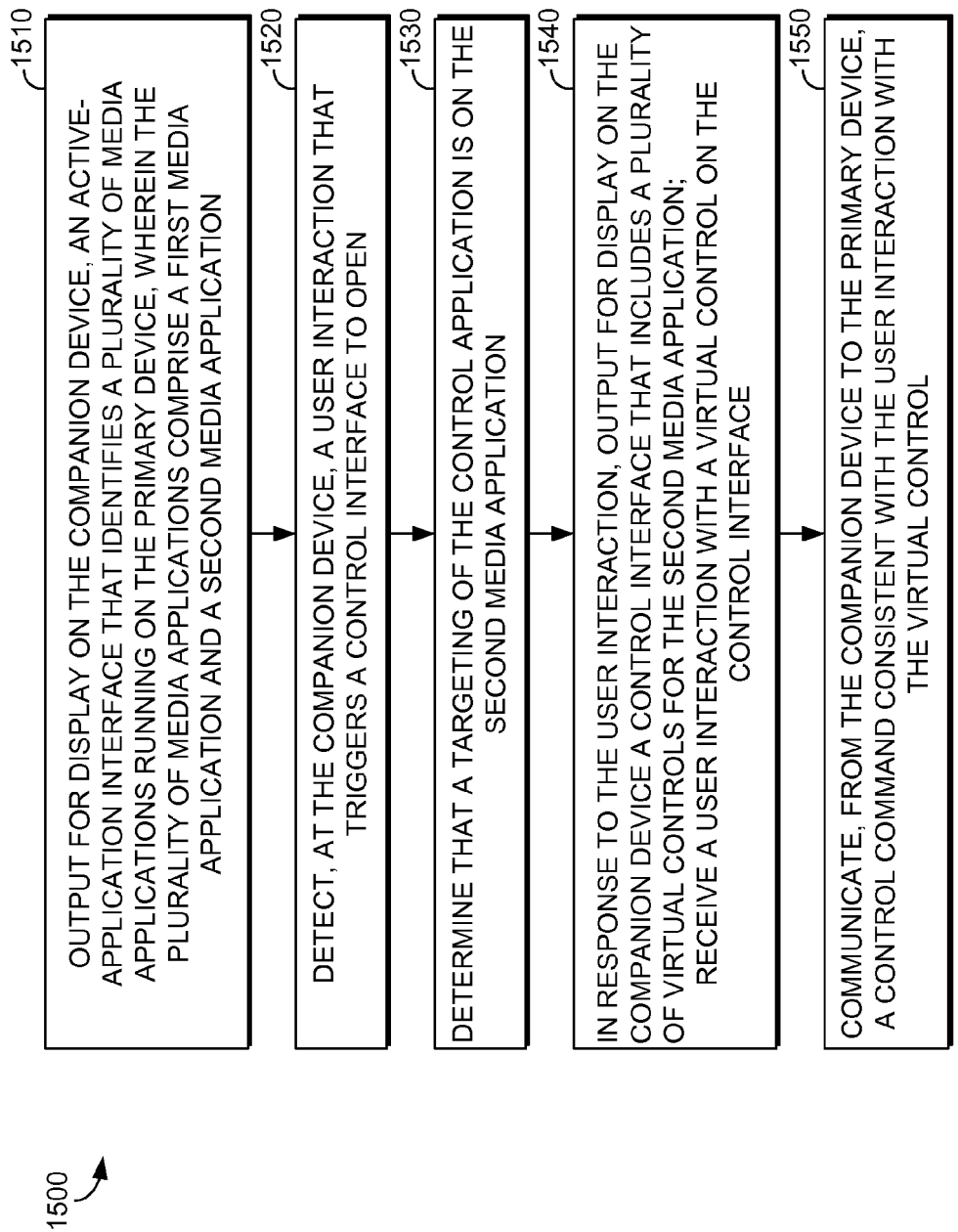

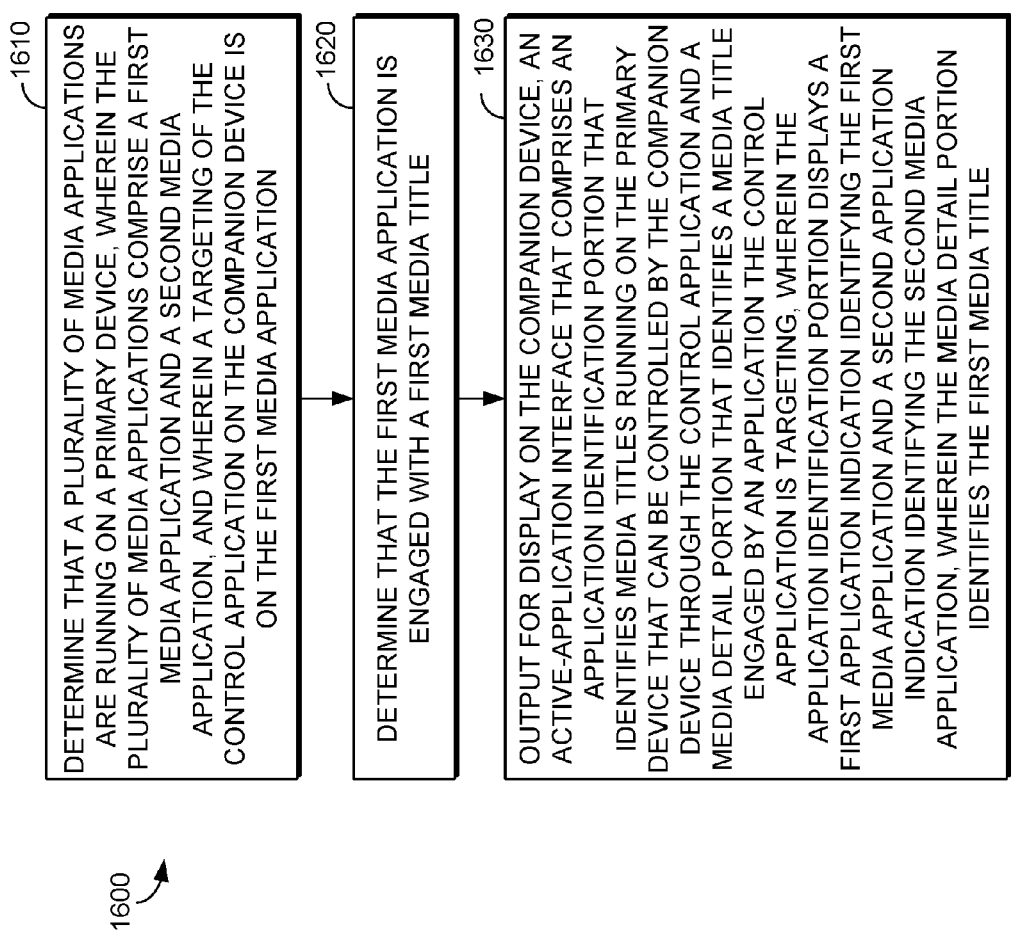

REMOTE APPLICATION CONTROL INTERFACE

BACKGROUND

Increasingly, televisions are used to display interactive content. For example, primary devices such as game consoles, digital video recorders (DVR), and the televisions will present web browser interfaces and media selection interfaces that can require complex navigation. In particular, these interfaces may require a user to scroll various selectable objects and to select an object. The interfaces may also require textual input.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Aspects of the present invention can comprise a method of using a control application running on a companion device to control media applications running on a primary device. The method comprises determining that a plurality of media applications are running on the primary device, wherein the plurality of media applications comprise a first media application and a second media application, and wherein a targeting of the control application on the companion device is on the first media application. The method also includes determining that the first media application is engaged with a first media title. The method also includes outputting for display on the companion device an active-application interface that comprises an application identification portion that identifies media titles running on the primary device that can be controlled by the companion device through the control application and a media portion that identifies a media title engaged by an application the control application is targeting. The application identification portion displays a first application indication that identifies the first media application and a second application indication that identifies the second media application. The media portion identifies the first media title because the targeting is on the first media application.

BRIEF DESCRIPTION OF THE DRAWINGS

Embodiments of the invention are described in detail below with reference to the attached drawing figures, wherein:

FIG. 6 is a diagram of a companion device showing a control interface that can control active applications on a primary device, in accordance with an embodiment of the present invention;

FIG. 7 is a diagram of an active-application interface that is located at the bottom of a companion device's touchscreen display, in accordance with an embodiment of the present invention;

FIG. 9 is a diagram of an active-application interface displaying two running application indications, in accordance with an embodiment of the present invention;

FIG. 10 is a diagram of an active-application interface displaying three running application indications, in accordance with an embodiment of the present invention;

FIG. 11 is a diagram of an active-application interface displaying four running application indications, in accordance with an embodiment of the present invention;

FIG. 12 is a diagram of an active-application interface displaying five running application indications, in accordance with an embodiment of the present invention;

FIG. 13 is a diagram of a volume control interface, in accordance with an embodiment of the present invention;

FIG. 14 is a diagram of a companion device's display showing a multi-process control interface, in accordance with an embodiment of the present invention;

FIG. 15 is a flow chart showing a method of using a companion device to control media applications running on a primary device, in accordance with an embodiment of the present invention;

FIG. 16 is a flow chart showing a method of using a companion device to control media applications running on a primary device, in accordance with an embodiment of the present invention.

DETAILED DESCRIPTION

Figure 1:
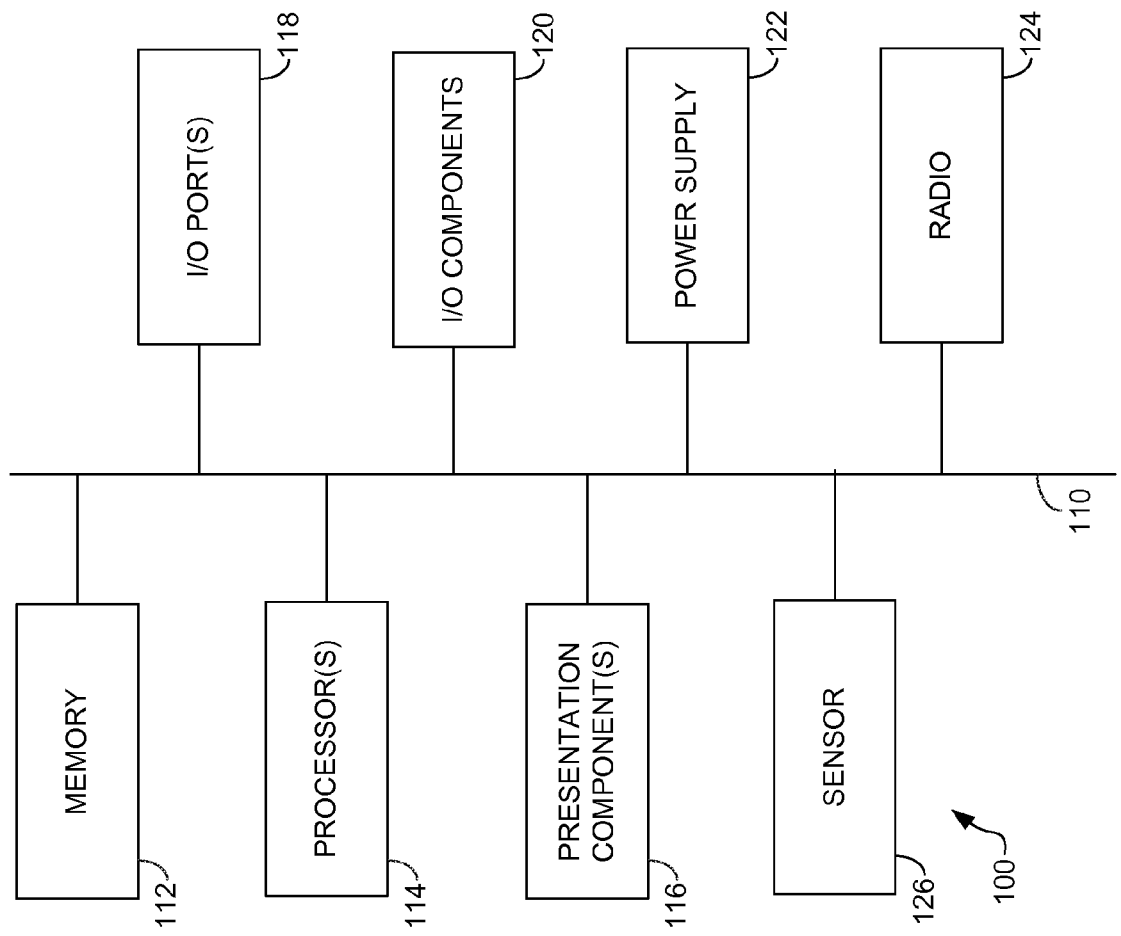
FIG. 1 is a block diagram of an exemplary computing environment suitable for implementing embodiments of the invention.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the present invention use a control application running on a companion device to control media applications running on a primary device. The companion device may display information about a media application running on the primary device and provide an interface for the companion device to control the application. In one aspect, the companion device can control a media application that is running in the background on the primary device without disrupting an application running in the foreground. The media application can be controlled through a contextual interface that includes virtual controls tailored to the particular application.

Remote application control is a companion application that allows a user to command and control experiences generated by an application running on a primary device. Web browsers, games, and streaming media applications are examples of applications running on a primary device that may be controlled using the companion device. Interfaces associated with each of the media applications on the primary device may be displayed on a television or other device coupled to the primary device.

As used herein, a "primary device" is a computing device that includes hardware and software that enables the primary device to run multiple media applications simultaneously and output a media presentation. The primary device is a consumer device that may be located in a user's residence and is not a remote server. Exemplary primary devices include a game console, a laptop computer, a personal computer, a television, a tablet, a smartphone, a set top box, and such.

The primary device may connect to multiple output devices to create an entertainment experience for the user. For example, a game console could be connected directly or indirectly to a television through which both video and audio output are presented. A game console could also be connected to an audio receiver that outputs audio content to speakers and visual content to a television. The primary device may also have audio and visual output mechanisms, such as a screen or speakers, built in.

As used herein, a "companion device" is a computing device with hardware components and software needed to generate a visible interface and input mechanisms the user can manipulate to interact with the interface. The companion device also has the ability to communicate with the primary device. For example, the companion device may have radio hardware and software necessary to connect to a wireless router and/or form a Bluetooth connection with the primary device. Alternatively, the companion device could use a wired connect such as a USB or Ethernet connection to communicate with the primary device. Exemplary companion devices include smartphones, tablets, and tablet PCs.

As used herein, a "media application" is an application that processes digital content to generate a user experience of the content. The user experience may include audio, visual, and tactile content. Exemplary media applications include an Internet browser, an entertainment streaming application (e.g., movie or audio streaming), a DVD playing application, a game application, a broadcast TV application, and such. The DVD application can read content on a DVD and deploy the primary device's hardware and software resources to present the DVD content to the viewer. The game application is not a video game title, but an application that deploys the primary device's hardware and software to execute the game code and create the game experience for the user.

Some media applications are able to be controlled by the control application on the companion device and others are not. In aspect, media applications that are able to be controlled are those that include an application program interface for the control application. Further, the user may be able to set preferences for whether or not an application can be controlled by the companion device. In aspects using user preferences, applications that are able to be controlled are those the user has given permission to be controlled.

As used herein, an application is in "control focus" on the primary device when the user is actively interacting with the application. The primary device uses a direct focus model that requires the user to focus on an application to manipulate the application. For example, when a user is playing a game title through the game application, then the game application is in control focus. Other applications maybe running simultaneously and be out-of-control focus. In one aspect, only a single application can be in control focus at a point in time.

As used herein, an application is "out-of-control focus" when the application is running but is not receiving active user interaction through the primary device. An application that is closed would not be running, and thus not out-of-control focus.

The applications may generate a graphical user interface that is displayed in a viewport associated with the application. As used herein, a "viewport" is a portion of a display allocated to an interface generated by the application. The viewport may be an application window. The viewport can be square, rectangular, or some other shape. The viewport may run in the foreground or the background. As used herein, "foreground" means the viewport is visible. As used herein, "background" means the viewport is not visible. An application may have a visible tab, icon, tile, or other indication and still be in the background.

The media titles are the entertainment content presented in the user experience. Different media applications can engage with different types of media titles. For example, an audio player may engage with songs in an MP3 format. A movie streaming application may receive a rendered video image of a movie title through a network connection.

As used herein, a "virtual control" is a software generated control. The virtual control is not a dedicated hardware control such as a volume button, knob, or similar. In one aspect, the virtual control is displayed on a touch screen and can be manipulated through the touch screen. For example, a contact on the touch screen corresponding to a location where the virtual control is displayed may constitute pressing the virtual control. Additional touch screen interactions with the virtual control are possible. Other possible interactions with a virtual control include sliding, spinning, tapping, and such. Another example of a virtual control is a virtual keyboard.

Having briefly described an overview of embodiments of the invention, an exemplary operating environment suitable for use in implementing embodiments of the invention is described below.

Exemplary Operating Environment

Referring to the drawings in general, and initially to FIG. 1 in particular, an exemplary operating environment for implementing embodiments of the invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks, or implements particular abstract data types. Embodiments of the invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, an illustrative power supply 122, radio 124, and sensor 126. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component 120. Also, processors have memory. The inventors hereof recognize that such is the nature of the art, and reiterate that the diagram of FIG. 1 is merely illustrative of an exemplary computing device that can be used in connection with one or more embodiments of the invention. Distinction is not made between such categories as "workstation," "server," "laptop," "handheld device," etc., as all are contemplated within the scope of FIG. 1 and reference to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory 112 may be removable, nonremovable, or a combination thereof. Exemplary memory includes solid-state memory, hard drives, optical-disc drives, etc. Computing device 100 includes one or more processors 114 that read data from various entities such as bus 110, memory 112 or I/O components 120. Presentation component(s) 116 present data indications to a user or other device. Exemplary presentation components 116 include a display device, speaker, printing component, vibrating component, etc. I/O ports 118 allow computing device 100 to be logically coupled to other devices including I/O components 120, some of which may be built in. Illustrative I/O components 120 include a microphone, joystick, game pad, scanner, hard/soft button, touch screen display, etc.

Radio 124 transmits are receives radio communications. The computing device 100 may be a wireless terminal adapted to received communications and media over various wireless networks. Computing device 100 may communicate via wireless protocols, such as code division multiple access ("CDMA"), global system for mobiles ("GSM"), or time division multiple access ("TDMA"), as well as others, to communicate with other devices (not shown in FIG. 1). The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is second example of a short-range connection. A long-range connection may include a connection using one or more of CDMA, GPRS, GSM, TDMA, and 802.16 protocols.

Sensor 126 observes device and environmental characteristics and conditions. Exemplary sensors comprise accelerometers, gyroscopes, GPS/Location, proximity sensors, light sensors, and vibration sensors.

Companion Environment

Figure 2:
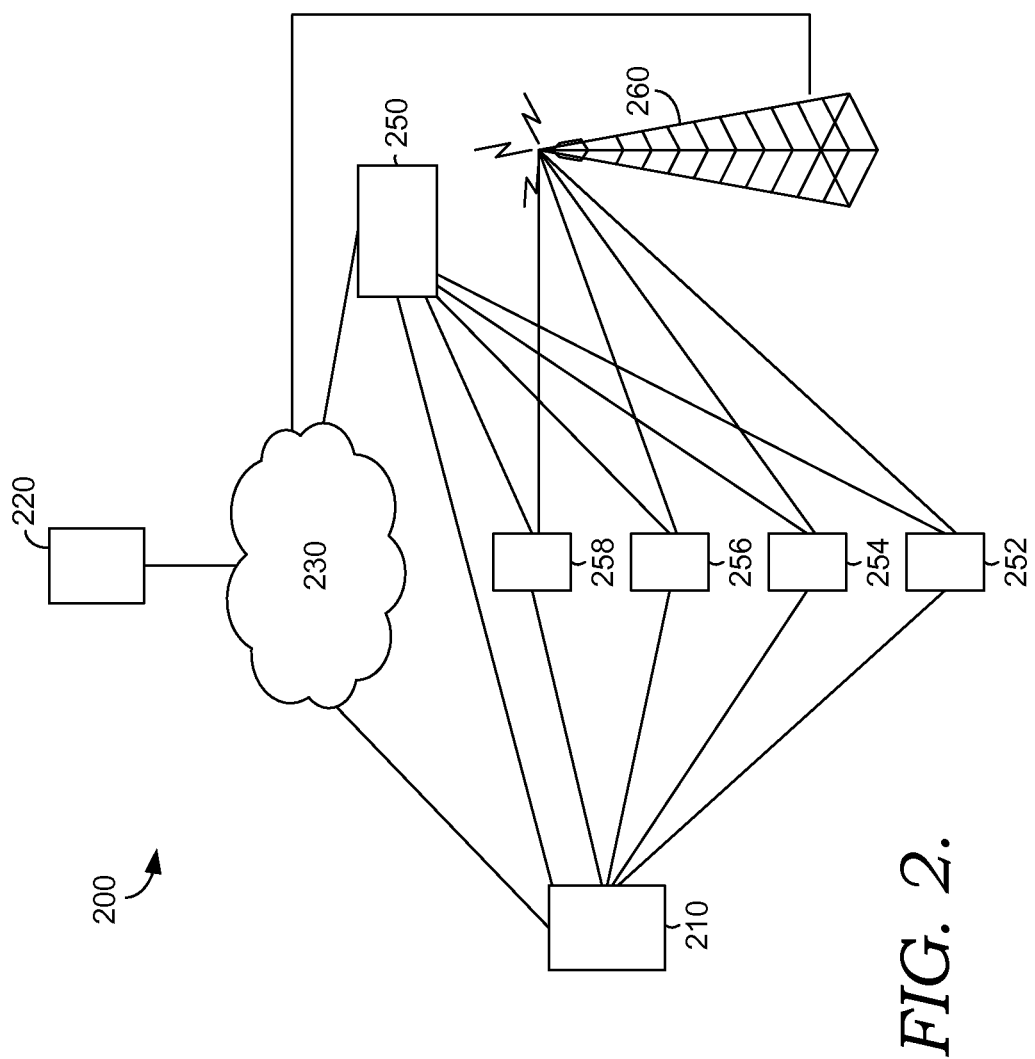
FIG. 2 is a diagram illustrating a variety of communication mediums between primary devices, online services, and companion devices, in accordance with an embodiment of the present invention.

Turning now to FIG. 2, a networked operating environment 200 comprising multiple computing devices that can provide a companion experience is shown, in accordance with embodiments of the present invention. The environment 200 includes a primary device 210, companion devices 252, 254, 256, and 258, a wireless router 250, a base station 260, a network 230 and a companion experience server 220. These devices are merely exemplary and are not intended to be limiting.

The primary device 210 may be a game console, media console, smart TV, DVD player, or other suitable computing device that presents titles. Titles may be games, movies, applications, music, videos, television shows, and other media content. The game console may be coupled to a display, such as a television.

The companion devices 252, 254, 256, and 258 are computing devices. A companion device, as used in this application, is a personal computing device that provides a second display and a control interface for applications running on the primary device. Examples include laptops, PCs, netbooks, smartphones, e-readers, PDAs, and tablets. A companion experience allows the user to interact with media applications running on a primary device 210 through interfaces on the companion device.

The companion experience server 220 can facilitate companion experiences by providing companion content, companion applications, registering and authenticating companion devices, facilitating communications between primary devices and companion devices, and performing other tasks. The companion experience server may be accessed via a wide-area network, such as the Internet. The companion experience server 220 can be omitted from some aspects of the present invention.

The companion devices 252, 254, 256, and 258 may communicate directly with the primary device 210 via Bluetooth, WiFi, or through another available interface. The companion devices could also communicate over a local wireless network generated by the wireless router 250. These connections could remain within a local area network "LAN" or they could be routed through the companion experience server 220. An exemplary LAN may be set up within a residence. The companion devices could also communicate with the primary device via a data service facilitated by base station 260. The base station 260 could route communications to the primary device 210 through whatever communication to the network 230 the primary device is using. The base station 260 could also be in direct communication with the primary device 210, if the primary device is using the same data service.

FIG. 2 shows multiple companion devices connecting to a single primary device 210. Though not shown, another exemplary computing environment could include multiple primary devices connecting to a single companion device. Alternatively, an exemplary computing environment could include multiple companion devices connecting to multiple primary devices.

Communication Session Between Primary Device and Companion Device

Figure 3:
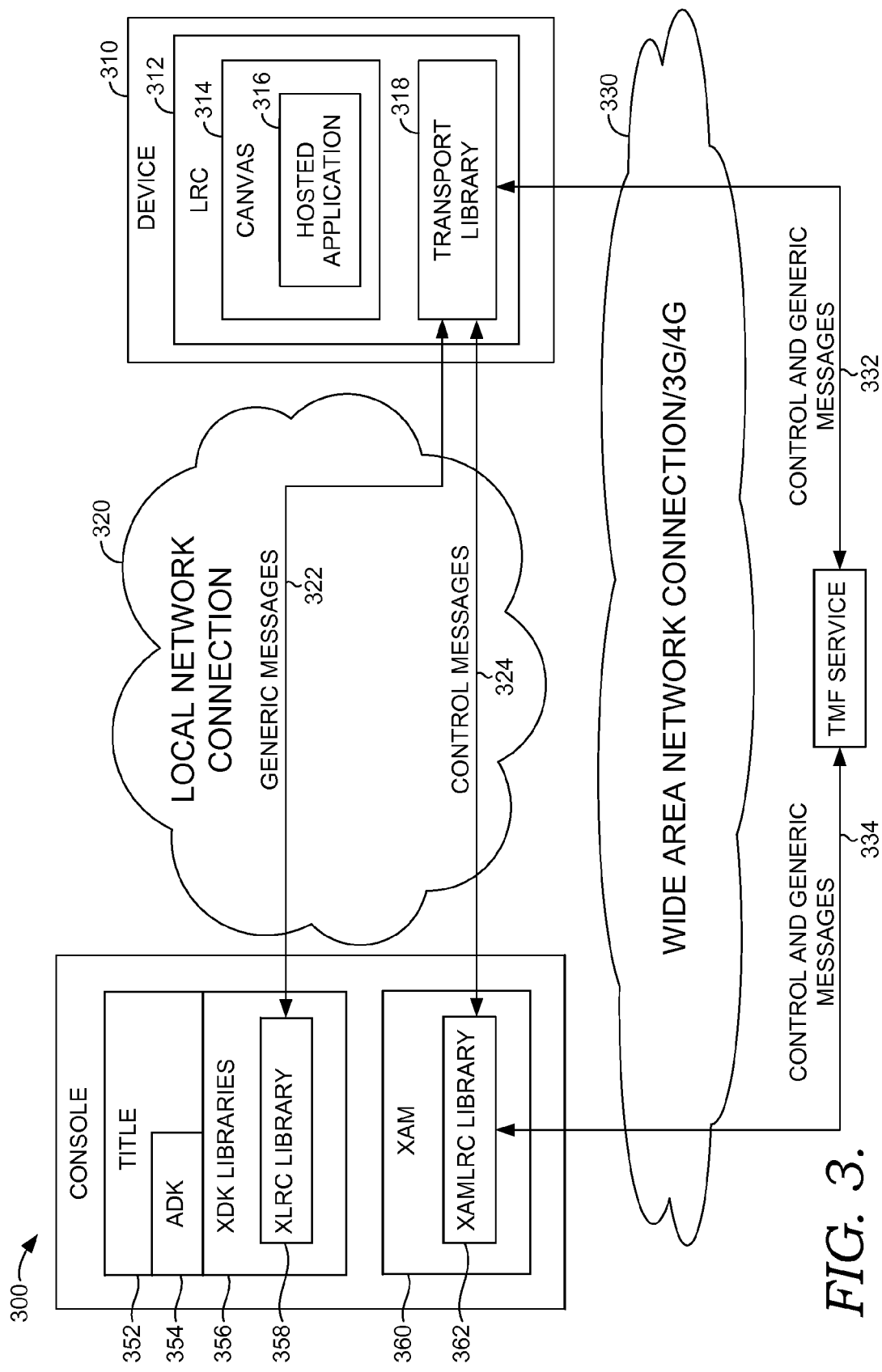
FIG. 3 is a diagram of a computing system architecture for generic messaging between a primary device and a companion device, in accordance with an embodiment of the present invention.

Turning now to FIG. 3, an exemplary diagram 300 is illustrated for generic companion-messaging between a device 310 and a console 350, in accordance with an embodiment of the present invention. The device 310 includes the LRC 312, the canvas 314, hosted application 316, and transport library 318. The console 350 includes the title 352, ADK 354, XDK libraries 356, XLrc library 358, XAM 360, and XAMLRC library 362. The title 352 may include console-based games and applications—written using either the XDK 356 or ADK 354. The ADK 354 is the console's application development kit. The XDK 356 is the console's development toolkit and includes the XLRC 358, which is the XDK 356 title library that implements the LRC 312 functionality and APIs. The XAM 360 is the system services and includes the XAMLRC 362 library that implements LRC 312 functionality and APIs. The XLrc library 358 refers to a console 350 (e.g. XBOX® provided by Microsoft Corporation of Redmond, Wash.) developer toolkit ("XDK") title library that titles need to link against to enable companion functionality. Canvas 314 is the container for hosting, title specific, hosted applications. The hosted application 316 may be a HTML5 page and its dependent CSS and JavaScript files, hosted on the developer's servers. Lastly, Transport library 318 includes both the existing TMF proxy for sending generic messages 322 and control messages 324 to support generic companion-messaging.

The components of the console 350 and the device 310 can provide an encrypted, communication channel between a title running on the console 350 and the LRC hosted application 316. The LRC 312 may also make use of the channel. The channel supports bidirectional, message-based communication with several delivery options: reliable, unreliable, and unreliable multicast/broadcast. Communication using this channel may be routed over the local network connection whenever possible on a per device basis. When the device 310 cannot connect directly to the console 350 over the local network connection, messages are delivered through a cloud-based service TMF service 340 in FIG. 3. Titles and hosted applications can determine from per-client data whether their connection is local, implying low latency. Embodiments support simultaneously connection of multiple companion platforms to the console 350 at any given point in time, regardless if they connected over the local network connection or through the TMF service 340. A hosted application may be a web based application loaded in an embedded browser that adds companion experiences to console based titles.

The generic companion-messaging session, automatically pairs a hosted application 316 on the companion platform with a title 352 on the console 350 based on a generic companion-messaging abstraction layer that facilitates platform-independent communication between the hosted application 316 and the title. Generic companion-messaging requires special codes to the console system services library ("XamLrc"), the title library that implements LRC functionality and APIs ("XLrc"), and the LRC Transport libraries. In one embodiments, the current XamLrc library is expanded to support multiple, connected devices over TCP. In another embodiment, only UDP is used with added reliability. In another embodiment, all code related to generic companion-messaging runs in the console system services ("XAM"), which would enable for easier protocol upgrades as there would be no generic companion-messaging protocol specific code running in title space. In another embodiment, the generic companion-messaging codebase is moved into the base platform-side API (e.g., XLrc library) running in title space. The abstraction layer also particularly supports the HTML Canvas 314; Canvas 314 is the container for hosting, title specific, hosted applications. The companion platform-side API provides abstraction for the generic companion-messaging to support dynamic scriptable rendering on the hosted application. The hosted application 316 may be a HTML5 page and its dependent CSS and JavaScript files, hosted on the developer's servers. The canvas is a companion platform control encapsulating the web browser control, JavaScript bridge, and object model exposed through the bridge to the HTML5 hosted in the control.

As part of the implementation of generic companion-messaging, a generic companion-messaging session (hereinafter "title message session") is implemented. These title message sessions are created on demand when a hosted application successfully connects to a title over the local network 320 or TMF service 340 via the wide area network 330. The TMF sends control and generic messages 332 and 334 between the device 310 and the console 350. Generic messages can include other title specific messages (e.g. touch and gesture events) delivered over the title to hosted application channel or TMF service 340. Generic messages may be title specific messages delivered over the title to hosted application channel or a TMF service 340. Simply, a title message session pairs the title and the hosted application together so that the XLrc 358 and XamLrc 362 can properly route and encrypt messages. A title message session may be initiated in association with a SDP ("Service discovery protocol"). An SDP is a network protocol which allows automatic detection of devices and services offered by these devices on a computer network. The SDP allows the console 350 to advertise a connection on the network and the device 310 to discover the network services of the console 350. Upon the configuration of the network configuration the title messaging session may begin initialization, and using the generic companion-messaging session, titles may send messages to a hosted application running on a specific client after they have received a notification indicating that specific client has connected implying a title message session has been established.

Both the device 310 and the console 350 need to be aware of the transport they employ for communication with one another. The device 310 transport library 318 attempts to establish a local network connection and therefore knows if it was successful. The console 350 is made aware of a local network connection when the device 310 successfully connects and then sends a title message session initialization message (e.g., XLRC_MESSAGE_CONNECT). Regardless, of the transport, the device 310 sends this message to initialize the title message session. Additionally, both the title 352 and the hosted application 316 can determine each devices transport when receiving information about each client.

One embodiment of generic companion-messaging uses reliable, point-to-point message delivery. The underlying transport is TCP for local network 320 connected devices. However, APIs may support unreliable delivery as well as broadcast addressing. Unreliable delivery may be used over UDP for local network 320 connected devices. Titles and hosted applications are expected to be aware that when messages are routed through TMF service 340 that delivery will be implemented using slower, reliable mechanisms. Lastly, broadcast addressing may be supported from the console 350 to all devices. Over reliable transports, this involves sending the message to each device 310 individually over TCP or the TMF service 340 depending on connectivity. Broadcast addressing over unreliable transports may be implemented using UDP multicast and the TMF service for those devices that are not connected directly.

The generic message may take different formats. In one embodiment, the message format supports three headers, one trailer, and several payloads. These message formats may include any additional framing that TMF service 340 adds for messages delivered using its service. The three headers may all share a common set of fields. To support generic companion-messaging a MessageKind (LRC_MESSAGE_KIND_GENERIC) is included in the message library. In one embodiment, the only valid data to be passed for a generic message is a Java Script Object Notation ("JSON") string, indicated with a new MessageType (LRC_MESSAGE_JSON).

Sequence numbers for LRC messages may be kept separately for control messages and generic messages. Simply, they originate in two different libraries on the console 350 and similarly different modules on the device 310. Keeping the sequence numbers separate allow the existing body of code dealing with matching a response with a request to continue to work unchanged.

The generic companion-messaging incorporates secure transport of messages so the console 350, devices 310, and TMF service 340 work together to provide a trustworthy system. From a security standpoint the device 310 is completely un-trusted when communicating with the console 350. The reverse is also true; the console 350 is completely un-trusted when communicating with the device 310. Additionally, it may be assumed that there are compromised devices on the local network 320 that are able to intercept all local network traffic. Service credentials (e.g., user account) are used to authenticate the user. Based on these credentials, a device 310 is allowed to rendezvous with a console 350 when the user on the companion platform is already signed into the console 350.

Given these constraints, traffic to and from the TMF service 340 is over HTTPS. The TMF service 340 may generate all encryption and signing keys. In one embodiment, the TMF service 340 generates a 128-bit HMAC_SHA1 key for signing all messages, ensuring no message has been tampered with. Additionally, the TMF service 340 generates a 128-bit AES key for encrypting all broadcast local network messages as well as per-device initialization messages. All clients (console and devices) receive these session-level signing and encryption keys when joining a session. These keys are changed and redistributed whenever a user on the console 350 signs out. To support per-device privacy, whenever a client joins a session it also receives a 128-bit AES key from the TMF service 340. The console 350 also receives this same key for each device 310 in the session. When a user signs out on the console 350, the keys associated with devices in the session where the same user was signed in are discarded and no longer used. A per-device encryption key allows the same user to sign in on multiple devices.

In an effort to mitigate some of the risk in having un-trusted, opaque data consumed by titles or hosted applications the contents of messages are accessible through a set of hardened function calls. The JSON protocol may be used for all generic message data. On the console 350, this will be exposed to the title developer through the XJSON Parser API. In the alternative, a concatenation of binary fields serialized using an API similar to .NET's BinaryReader may be used. The data size may be set to 1K bytes. Titles are written in such a way that if they are compromised on user's console then they can be revoked.

Remote Application Control

Figure 4:
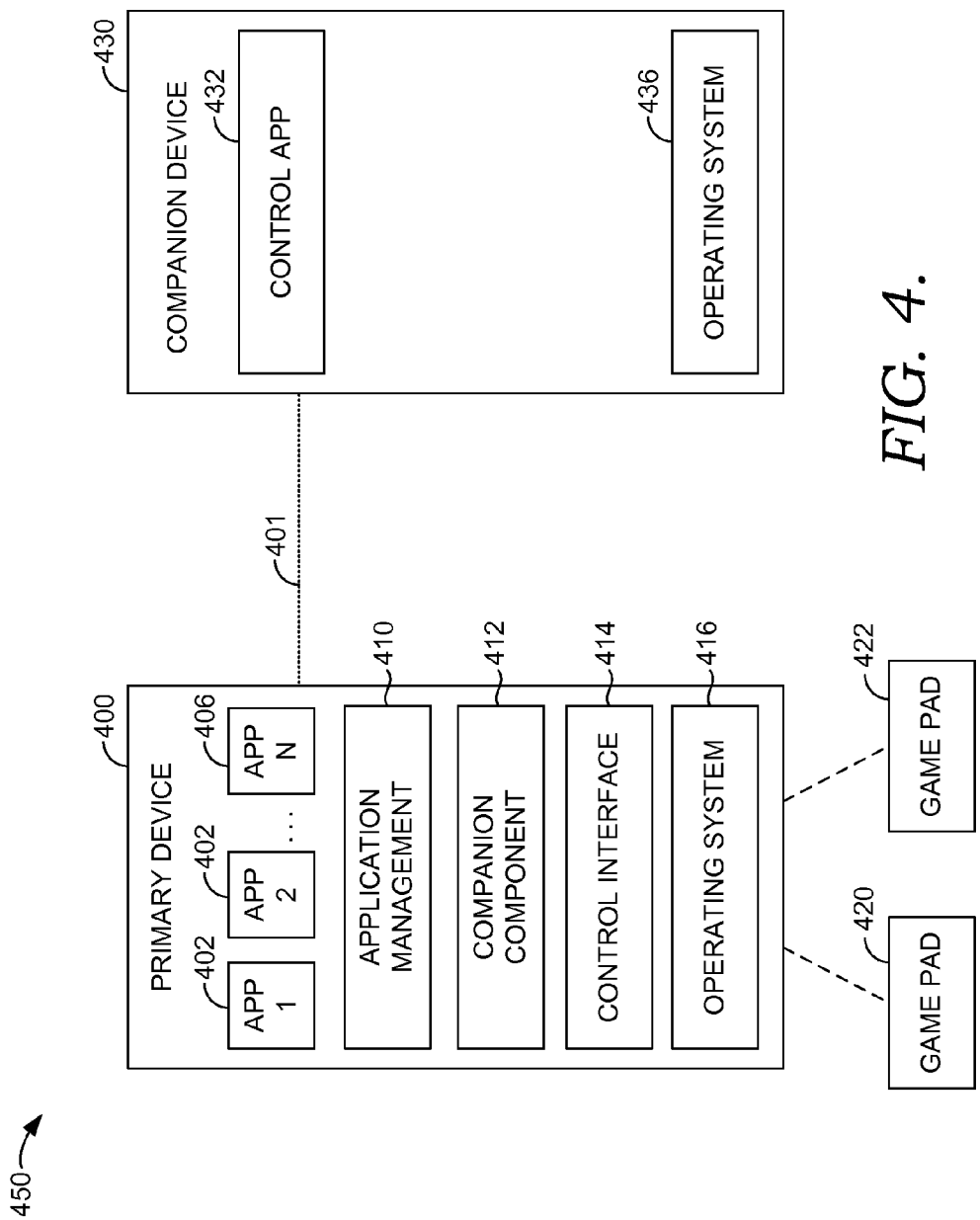
FIG. 4 is a diagram of a computing system architecture for controlling an application running on a primary device using a companion device, in accordance with an embodiment of the present invention.

Turning now to FIG. 4, an exemplary computing environment 450 suitable for use with aspects of the invention is shown, in accordance with an aspect of the present invention. Exemplary computing environment 450 includes a primary device 400 connected to companion device 430 by communication link 401. The communication link 401 may be formed in any manner including those described previously with reference to FIG. 2. The communication link 401 can be wired or wireless, direct or indirect. In one aspect, the communication link occurs over a local area network and the companion device 430 is located within the primary device's presentation area.

The primary device 400 is a computing device having hardware and software suitable for running multiple media applications. Exemplary media applications have been described previously and include applications capable of engaging video games, audio content, audiovisual content, webpages, or other content to generate a media presentation. The primary device includes an operating system 416, a control interface 414, a companion component 412, an application management component 410, a first application 402, a second application 404, and an $n^{th}$ application 406. Aspects of the present invention are not limited to primary devices running three applications. Three applications were selected for use in this example for the sake of simplicity.

The operating system 416 manages hardware resources on the primary device and enables the primary device 400 to run applications.

The control interface 414 receives input from one or more control devices such as a gamepad 420 and a gamepad 422. Other dedicated devices could include a remote control, a keyboard, a mouse, a microphone, and a camera. In one aspect, the camera may be used to provide a gesture interface. In one aspect, the microphone can be used to provide a natural language interface. The control devices may be used to control an application running in the control focus on the primary device 400.

The companion component 412 interacts with the control application 432 on the companion device 430. The companion component 412 generates instructions that are sent to the applications on the primary device. The applications respond to the instructions by manipulating the applications according to the instructions. The applications manipulated by the companion component 412 may be out-of-control focus on the primary device 400.

The application management component 410 manages viewports generated by different applications. A viewport may be in the foreground or background. The foreground and background state of a viewport may be changed using controls received by the control interface 414. Additionally or alternatively, the control application 432 may generate instructions to change the foreground/background state of an viewport. A foreground viewport may consume the entire display area available to the primary device when in full screen mode. Alternatively, a foreground viewport may consume less than the entire display area available to the primary device, such as 75% of the available display area, 50% of the available display area, or 25% of the available display area.

The companion device 430 is a computing device having hardware and software capable of generating a control interface for the user and communicating control instructions to the primary device 400. Exemplary companion devices include a tablet and a smartphone. The companion device 430 includes an operating system 436 that manages the companion device's hardware. The companion device 430 and the primary device 400 can run different operating systems. Alternatively, the companion device 430 and the primary device 400 can run the same operating system. The companion device can include a touch screen.

The control application 432 generates an active-application interface that presents information about one or more applications running on the primary device and allows the user to open up an application-specific control interface. The application-specific control interface can be used to control an application running on the primary device. The control application 432 can target a different process or application running on the primary device. The targeting defines which application will be controlled by the control application 432 through the companion device 430. The user may switch the control application's targeting from application to application. The control application 432 may target an application that is in control focus or out-of-control focus on the primary device. As used herein, targeting refers the application being controlled by the control application 432 through the companion device.

Figure 5:
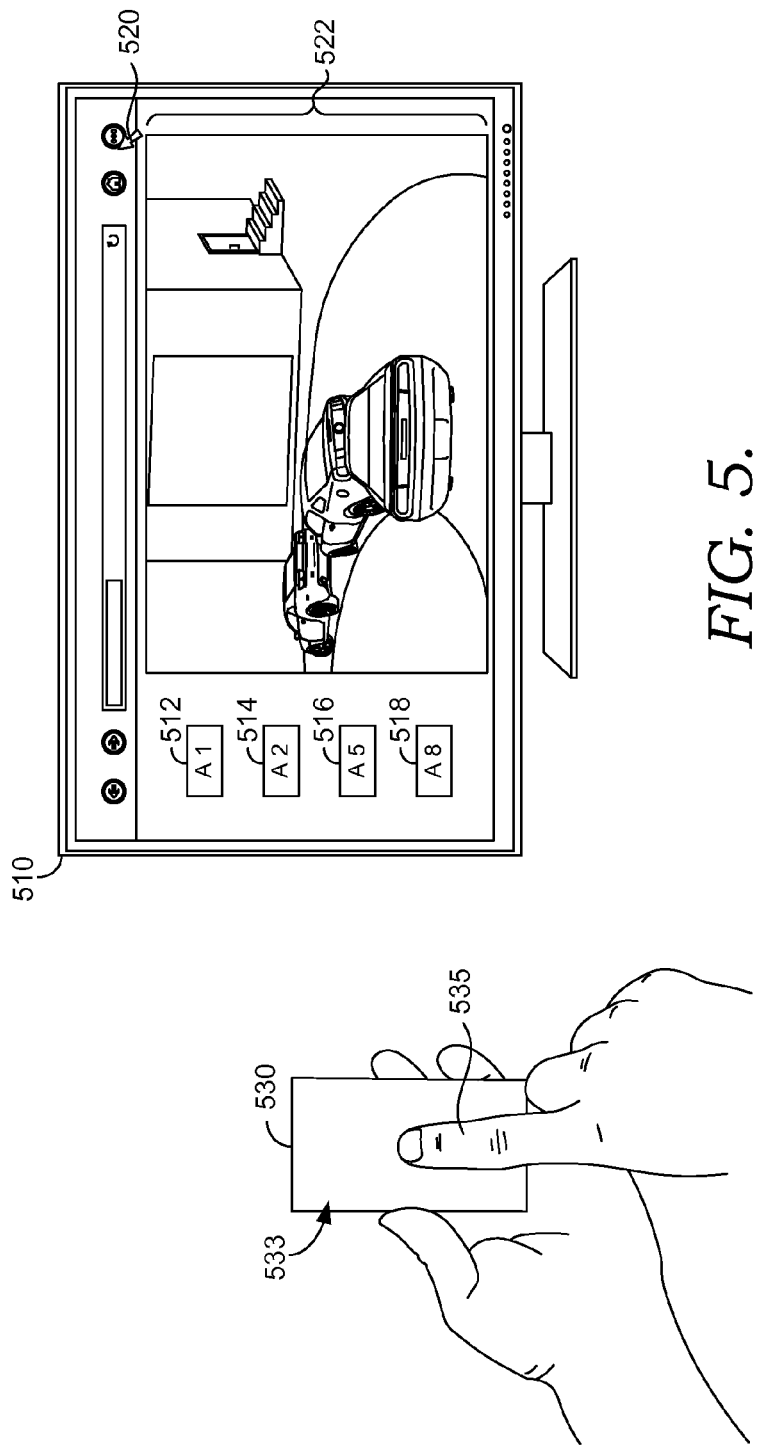
FIG. 5 is a diagram of a person using a companion device to control media applications on a primary device, in accordance with an embodiment of the present invention.

Turning now to FIG. 5, a presentation area 500 is shown, in accordance with an aspect of the present invention. The presentation area 500 includes a primary device 510 and a companion device 530. The primary device 510 is a smart television, in this example, and the companion device 530 is a smartphone. Viewports are visible for five applications running on the primary device 510. The different viewports have different sizes which can be set through the primary device or the companion device. The viewport 522 is generated by a game application, or process, engaged with a driving game title. The viewport 522 is running in fill mode on the primary device. The viewport 522 is in control focus on the primary device because the user is playing the game using a gamepad (not shown).

The A1 application is generating the viewport 512, the A2 application is generating the viewport 514, the A5 application is generating the viewport 516, and the A8 application is generating the viewport A8. The viewports 512, 514, 516, and 518 are all running in snap mode. The snap mode is a minimized state where the interface is reduced in size compared to a viewport in fill or full screen mode. The A1, A2, A5, and A8 processes are running and can be producing content output, such as music or video. The control application on the primary device can control the processes running on the primary device.

A control application running on companion device 530 may generate an interface 533 that the user can interact with using his finger 535. The interface 533 may be used to control one of the applications running in the background without disrupting gameplay or altering the interface 522.

FIG. 6 displays a companion device 600 that runs a control application capable of controlling multiple applications running on the companion device. In the aspect shown, the companion device 600 is a smartphone that has a touch screen 610. The control application can output different types of interfaces depending on what task the user is attempting to complete. Each type of interface may be adjusted to match the context of the companion device 600 and the primary device (not shown).

FIG. 6 shows an active-application interface 616 generated by the control application along with interface components that are not related to the control application. The unrelated interface components include a native application portion 614 and a utility bar 612. The native application portion may run any application installed on the companion device 600. The utility bar 612 can provide functions related to the control application, including a connection button that opens a connection menu through which available primary devices can be selected for connection. Other utility functions include app navigation and search. FIG. 6 illustrates that the control application, and specifically an active-applications interface, can be displayed along with other interfaces including those generated by other applications and the operating system.

Turning now to FIG. 7, an active-application interface 616 is shown, in accordance with an aspect of the present invention. The active-application interface 616 includes an application control portion 710 and a global control portion 720. The global control portion 720 includes a global volume icon 722 and a global control icon 724. The global volume icon 722 opens a volume control interface through which the volume of the primary device can be controlled. The global volume control is not specific to a particular application running on the primary device. An exemplary volume control is described subsequently with reference to FIG. 13. The global control icon 724 causes a global control interface to open that can control functions on the primary device. The global control interface is not specifically tailored to a particular application running on the primary device.

The application control portion 710 includes information describing the state of one or more applications running on the primary device and can also include a trigger for an application-specific interface to be opened. Application indication 712 is the only application included in FIG. 7. Indication 712 uses an icon to communicate that a web browser application is running on the primary device. In one aspect, indication 712 is interactive and will open an interface tailored to control the web browser upon receiving a user interaction, such as a touch or other election. The media detail 714 describes the media title engaged by the web browser on the primary device. In this case, the web browser is engaged with a media title described as "game blog." Game blog is the name of a webpage loaded into the web browser.

Figure 8:
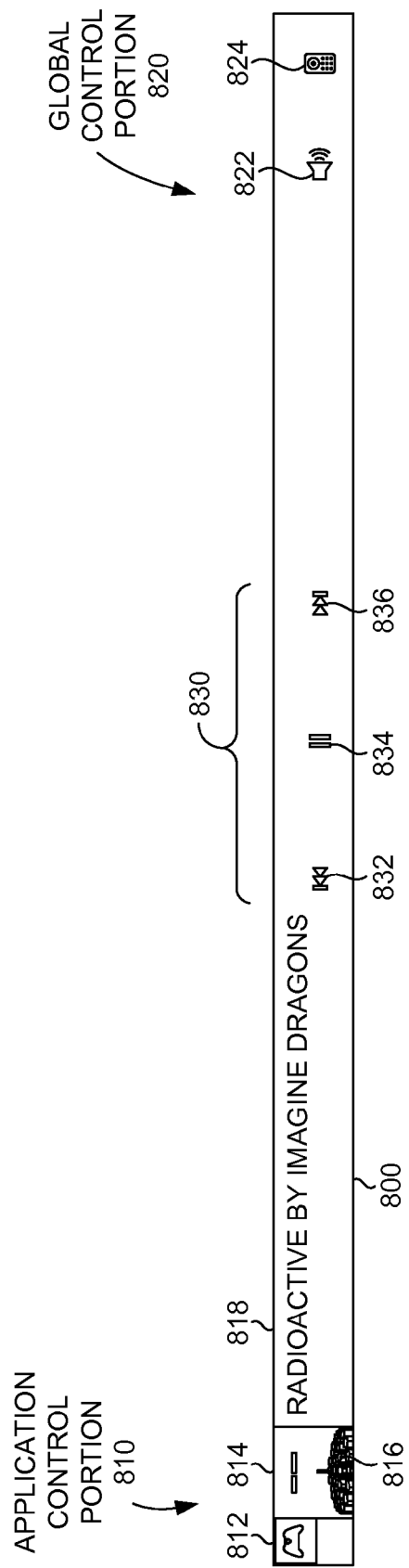
FIG. 8 is a diagram of an active-application interface that is located at the bottom of a companion device's touchscreen display, in accordance with an embodiment of the present invention.

Turning now to FIG. 8, an active application interface 800 is shown, in accordance with an aspect of the present invention. The interface 800 is sized to run on a tablet, in contrast to the interface 616, which is sized to run on a smartphone. More controls can be included on the interface 800 because tablets have a larger screen. The interface 800 includes an application control portion 810, a global control portion 820, and a media control portion 830. The application control portion 810 includes application-specific information and controls. The global control portion 820 includes controls that are not application specific and could apply to all applications (e.g., volume, display settings) or no applications (e.g., volume power on/off).

The media control portion 830 includes a plurality of contextual controls for a media title engaged by a media application that is currently being targeted on the companion device.

The contextual media controls shown in FIG. 8 are designed to interact with an audio player running on the primary device. The contextual controls include a previous song control 832, a pause control 834, and a next song control 836. The controls selected for inclusion in the media control portion 830 can be contextual to the state of the media title within the media application. For example, when a media title is in the play state, a pause control may be included. When the media title is paused or stopped, a play control could be included.

The global control portion 820 includes a global volume control 822 and a global control interface icon 824. These may be similar to the like named controls described with reference to FIG. 7.

The application control portion 810 includes application indication 812 for a game application and application indication 814 for an audio application. The application control portion 810 can describe all applications running on the primary device that are able to be controlled through the control application. In this example, the audio application 814 is being targeted by the control application. In various aspects, targeting may be indicated by the location of the application indication, the size of the application indication, and/or other characteristics of the application indication. In this case, the application indication 814 is larger than the application indication 812. In one aspect, the application control portion 810 includes a section for untargeted applications and a single, prominent location for the application indication associated with the application being targeted on the companion device.

The audio application is described using cover art 816 taken from the media title actively engaged by the audio player application. The media title detail 818 includes the name of an album and the album's artist. The application control portion 810 could include any number of application indications identifying applications running on the primary device.

Turning now to FIG. 9, the active-application interface 616 is shown with two application indications. The active-application interface 616 is sized for display on a smartphone and does not include a media control portion. The application indication 716, corresponding to an audio player application, has been added to the application control portion 710. The web browser associated with application indication 712 is being target on the companion device, as indicated by its prominence relative to the other application indications. The audio play associated with the application indication 716 is not being targeted.

In one aspect, the targeting may be changed by selecting an application indication associated with an untargeted application. For example, selecting application indication 716 may cause the targeting on the companion device to change to the audio player application. In this example, indications 712 and 716 could change places when targeting changes. Selecting application indication 712 can cause an application-specific control interface to be displayed. Selecting the media detail 714 can also cause the application-specific control interface to open. The application-specific control interface is tailored to the corresponding application.

Turning now to FIG. 10, the active-application interface 616 having three application indications is shown, in accordance with an aspect of the present invention. Application indication 717 has been added to the untargeted group in the application control portion 710, when compared with FIG. 9. Again, in one aspect, the targeting on the companion device may be changed by selecting either indication 716 or indication 717. In other words, indications associated with applications that are not targeted may be interactive to change the targeting. An indication associated with an application being targeted may be interactive to open a control interface associated with the application. The control interface may include additional mechanisms for changing the targeting.

Turning now to FIG. 11, the active-application interface 616 shows four application indications, in accordance with an aspect of the present invention. In contrast to FIG. 10, the application indication 718 has been added. In addition, the audio player application associated with the application indication 716 has been targeted on the companion device as indicated by its more prominent appearance. The application indication 712 has also switched places with the application indication 716 and is no longer grouped with the untargeted group. In addition, the application indication 716 has changed in appearance as the audio player icon was replaced with cover art for the media title engaged by the audio player application. The media detail 721 has changed to describe the media title engaged by the audio player application. In one aspect, the additional details provided about an application and media title engaged by the application indicate that the application is targeted on the companion device.

Turning now to FIG. 12, the active-application interface 616 is shown with five application indications, in accordance with an aspect of the present invention. In contrast to FIG. 11, application indication 719 has been added. In addition, application indication 717 has changed from untargeted to targeted. The media title information 723 has also changed to describe the media engaged by the game application.

In one aspect, a visual indication may be provided on the interface generated by the primary device to communicate which application is targeted for the companion device. For example, an icon, window, or other indication associated with an application may change in appearance when it is targeted on the companion device. For example, an indication associated with an application on the primary device may glow or change colors when it is targeted by the companion application.

Turning now to FIG. 13, an audio control interface 1300 is shown, in accordance with an aspect of the present invention. In an aspect, the audio control interface 1300 controls the volume on the primary device and is displayed on the companion device. The audio control interface 1300 includes a close interface control 1310, a mute control 1312, a volume up control 1314, and a volume down control 1316. In one aspect, selecting any portion of the right half of the interface 1300, excluding the close interface control 1310, causes the volume to go up. Similarly, selecting any portion of the left-hand side of the interface 1300 can cause the volume to go down. Conceptually, the audio control interface 1300 can be thought of as divided into three virtual buttons (i.e., volume up, volume down, and mute). This allows the audio to be controlled easily without the user having to look carefully at where he is contacting a touch screen. Allowing the user to control the volume without having to remove his attention from the interface generated by the primary device can increase efficiency. In one aspect, the audio control interface 1300 closes automatically after no input is received from the user for a threshold period of time. In one aspect, the threshold period of time is more than two seconds, for example five seconds. In one aspect, the threshold period of time is less than twenty seconds, for example ten seconds.

In aspects, the application targeting on the companion device may be changed without changing the state of the applications running on the primary device. In addition to not changing the state, the appearance of the overall interface provided by the primary device may remain the same when the primary device is used to control an application that does not have a visible viewport on the primary device's interface.

Turning now to FIG. 14, a smart phone interface 1400 including an application-specific control interface 1420 is shown, in accordance with an aspect of the present invention. The interface 1400 includes an active application interface 616, the application-specific control interface 1420, and an application tray 1430. The application tray includes a control 1410 that allows the user to open another application on the primary device.

The application-specific control interface 1420 includes detailed information's about a media title engaged by an associated application and controls tailored to controlling the application. The detailed media title information includes the media title 1419 and cover art 1418. The progress bar 1428 shows the state of the media title. In this example, the progress bar 1428 shows that a song has been played for 23 seconds as a total duration of four minutes 18 seconds. The contextual controls include a previous song control 1422, a pause control 1424 and a next song control 1426. Pushing any of these buttons will cause a control instruction to be generated and sent to the primary device where the associated application will be updated accordingly. For example, pushing the pause control 1424 would cause the presentation of the media title to be paused.

The application-specific control interface 1420 also includes a contextual help button 1414. The contextual help button automatically opens a help dialogue for the associated application. The help interface is launched on the companion device, though the associated application is running on the primary device.

Turning now to FIG. 15, a method 1500 of using a companion device to control media applications running on a primary device is shown, in accordance with an aspect of the present invention.

At step 1510, an active-application interface is output for display on the companion device. The active-application interface identifies a plurality of media applications running on the primary device. The plurality of media applications comprise at least a first media application and a second media application. The first and second media applications may engage with different types of media titles. For example, the first media application could engage with game titles while the second media application engages with audio files.

As used herein, to "engage" with a media title means to read the content of the media title and take steps to generate a user experience of the media title. Engaging can include executing computer code. For example, engaging with a video game requires the game application to execute the video game title's code. In the case of a movie or audio file, engaging may include reading the content of a file and processing the content to generate an experience. The media application can be engaged with a media title even when a user experience is not presently being generated. For example, an audio application is engaged with a song title when the song is paused. Similarly, an Internet browser can be engaged with a webpage when the user is not viewing the webpage, so long as the Internet browser is active.

A media application is active when processes associated with the media application are running. The media application can be active and not engaged with a media title. For example, a user can open a video application but not select a video for presentation. In this state, the video application is active, but not engaged. The video application could be minimized, hidden, or otherwise not prominently displayed and still be active. After closing or terminating the video application, the video application would not be active.

In one aspect, the companion device includes a touch screen on which the active-application interface is output for display. The user can interact with the active-application interface using their finger, a stylist, or other mechanism. The companion device may also receive voice commands and gestures that can be interpreted as an interaction with the active-application interface. In one aspect, the active-application interface is a bar located at either the top or bottom of the display.

At step 1520, a user interaction that triggers a control interface to open is detected at the companion device. In one aspect, the trigger is the user touching the active-application interface or a designated portion of the interface. As used herein, "touching" may comprise the use of a stylist, finger, or any other mechanism for contacting a touch screen. In one aspect, the active-application interface is divided into a global controls portion and an application portion. In one aspect, touching the application portion of the active-application interface opens the control interface.

In one aspect, the trigger may be a gesture made with the companion device. For example, the user could shake the companion device twice within two seconds to activate the control interface. The user could twist, flip, or perform another gesture with the companion device to open the control interface, in another aspect. A voice command is another example of a possible trigger to open the control interface.

At step 1530, a targeting of the control application is determined to be presently on the second media application that is running on the primary device. The targeting for the control application can be different from the application the user is interacting with on the primary device through a device other than the companion device. For example, the user may be interacting with the first application through a gamepad while the second application is running with a minimized viewport.

As used herein, the "targeting" is a state of the active-application interface that designates a running application on the primary device that the companion device is presently set to control. The targeting may be changed by the user through one or more mechanisms. For example, an interface may be provided on the companion device for the user to change the targeting among running applications. Rules may be followed automatically to initially set the targeting and change it contextually. In one aspect, state information is received from the primary device to determine what applications are running State information can identify the media applications running on the primary device and media titles engaged by the media applications.

The targeting may be set upon opening the active-application interface by following one or more rules. For example, a user can establish a preferred default targeting on the companion device through a menu provided by the active-application interface. In another example, the targeting could initially be set to the first application open on the companion device during a user session.

In one aspect, the targeting on the companion device is changed upon determining that the application presently being targeted is closed. In one aspect, upon determining that the application being targeted is closed, the targeting is automatically reset to whatever media application consumes the most amount of the interface on the primary device when the second media application was closed. Alternatively, the application being controlled through the primary device may be targeted automatically by the companion device when an application being targeted is closed.

A user session may be defined as a time period of consistent interaction with the companion device. For example, the user session could terminate after user interaction with the primary device ceases for a threshold period of time. The threshold period of time can vary based on the application in control focus on the primary device. For example, when the media title is a movie, then no user interactions may be expected during the length the movie presentation. Thus, when a movie is being presented, the threshold period of time may be the duration of the movie plus fifteen minutes. During a video game, the threshold time could be ten minutes from the last interaction.

In one aspect, the primary device is coupled to a camera with a view of the presentation area. The presentation area is an area of a room in which users can view the media presentation provided by the primary device. For example, people sitting on a couch in front of a television could be in the presentation area. In one aspect, the user session bounds are determined by the presence or absence of people in the presentation area by analyzing visual data received from the camera. A user session may start when the users enter the room and terminate when the users leave the room. In one aspect, the primary device determines when a user session is ongoing and provides user session information to the companion device.

Interactions through the primary device are distinct and separate from interactions through the companion device. For example, any touch input, audio input, visual input, or other input received by the companion device is not considered input through the primary device even when the companion device is used to control an application running on the primary device. Input to the primary device is received through controllers or input mechanisms dedicated to the primary device. For example, buttons integrated into the primary device, a gamepad connected to the primary device, a keyboard connected to the primary device, a mouse connected to the primary device, and/or a camera or other sensors connected to the primary device may all be said to be controlling the primary device. Input through these dedicated devices comprise "input to the primary device."

At step 1540, in response to the user interaction at step 1530, a control interface is output for display on the companion device. The control interface includes a plurality of virtual controls for the second media application. In one aspect, the plurality of virtual controls are contextually selected based on the second media application and a state of the second media application. For example, if the second media application is an audio player, then controls suitable for selection of an album; selecting a song; and starting, stopping, fast-forwarding, and rewinding a song may be provided along with other virtual controls. If the state of the audio player is playing a song at the 2:30 mark, then the virtual controls could include a status bar indicating that the song is 4:00 minutes long and is presently at the 2:30 part. The virtual control could also include a pause button, but not a play button when a song is already playing. Conversely, if the state of the audio player interaction with the song indicates that playing is paused, then the virtual control could include a play button but not a pause button. Other contextual controls are possible.

At step 1550, a control command consistent with the user interaction with the virtual control is communicated from the companion device to the primary device. As mentioned, the primary device and companion device are in communication with each other through one or more mechanisms including wireless and/or wired mechanisms. The control command can take the form of an instruction that is interpreted by the primary device. In one aspect, the primary device manipulates the application according to the control command without disrupting the operation of other applications running on the primary device.

In one aspect, the active-application interface is output automatically without user intervention upon formation of a data connection between the companion device and the primary device in response to detecting the data connection. Upon detecting the data connection between the companion device and the primary device, the active-application interface is added to part of the screen. The size of the content presently on the screen may be adjusted automatically to accommodate the active-application interface. In other words, the active-application interface may take up just a portion of the available screen space on the companion device.

Turning now to FIG. 16, a method 1600 for using a companion device to manipulate an application operating on a primary device is shown, in accordance with an aspect of the present invention. At step 1610, a plurality of media applications are determined to be running on the primary device. The plurality of media applications comprise a first media application running on the primary device and a second media application running on the primary device. As mentioned, the primary device may run multiple media applications simultaneously. The targeting of the control application on the companion device is on the first media application.

At step 1620, the first media application is determined to be engaged with a first media title. A state message from the primary device may facilitate determining what applications are running on the primary device. The state message may also communicate what media titles each media application is engaged with.

At step 1630, an active-application interface is output for display on the companion device. The active-application interface comprises an application identification portion that identifies media titles running on the primary device that can be controlled by the companion device through the control application and a media detail portion that identifies a media title engaged by an application the control application is targeting. In one aspect, not all of the processes or applications running on the primary device are able to be controlled by the control application. For example, applications lacking user permission to be controlled may not be able to be controlled. Similarly, applications that do not include the necessary application program interfaces may also be unable to be controlled.

The application identification portion displays a first application indication identifying the first media application and a second application indication identifying the second media application. The application indication may be an icon or logo associated with the application. The media detail portion identifies the first media title because the targeting is on the first media application. The media detail may include cover art for the media, a title, an artist, and/or other relevant information.

In one aspect, the active applications and active media titles are identified through the use of icons or tiles on the active-application interface. For example, an icon associated with a web browser could server as the application indication. In another example, the cover art for a media title engaged by the application could server as the application indication or be displayed in conjunction with an icon identifying the active application. Active media titles could also be described by listing the title of the media, the author or performer, or other information to identify the title. In one aspect, shortened titles or snippets are used to describe the media title.

Figure 17:
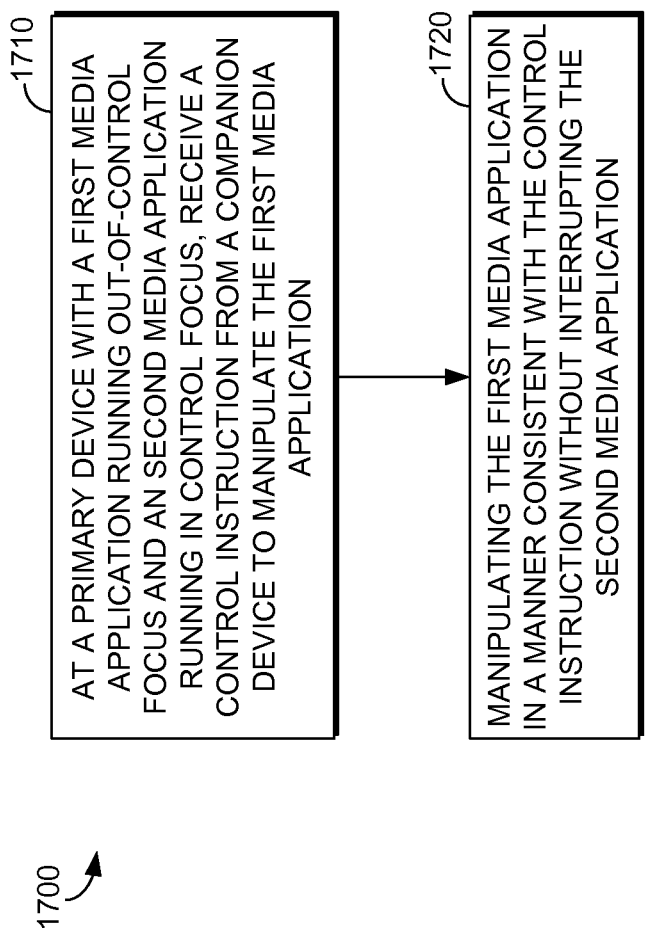
FIG. 17 is a flow chart showing a method for using a companion device to manipulate a graphical user interface generated by an application operated on a primary device, in accordance with an embodiment of the present invention.

Turing now to FIG. 17, a method 1700 for using a companion device to manipulate a graphical user interface generated by an application operated on a primary device is provided, in accordance with an aspect of the present invention. At step 1710, at a primary device with a first media application that is out-of-control focus and a second media application that is in control focus, a control instruction is received from a companion device to manipulate the first media application.

At step 1710, the first media application is manipulated in a manner consistent with the control instruction without interrupting the second media application. For example, the second media application may be manipulated without disrupting the display of content generated by the first media application. Similarly, the manipulation of the second media application may be completed without providing any audible or visible indications to the user through the primary device or output mechanism to the primary device. The companion device is excluded as an output mechanism for this purpose. As an example, a user could be playing a video game through the first media application and change the songs output by an audio player, which would be the second media application. Changing a song or other media content does not constitute a disruption or interruption as used in step 1720. Thus, changing songs would be noticeable by the user but is not an interruption in a way that a beep or making the second media application the active or foreground media application would interrupt.

Embodiments of the invention have been described to be illustrative rather than restrictive. It will be understood that certain features and subcombinations are of utility and may be employed without reference to other features and subcombinations. This is contemplated by and is within the scope of the claims.

The invention claimed is:

1. A method of using a control application on a companion device to control media applications running on a primary device, the method comprising:

outputting for display on the companion device, an active-application interface that identifies a plurality of media applications running on the primary device, wherein the plurality of media applications comprise a first media application and a second media application;

detecting, at the companion device, a user interaction that triggers a control interface to open;

determining that a targeting of the control application is on the second media application;

in response to the user interaction, outputting for display on the companion device the control interface that includes a plurality of virtual controls for the second media application;

receiving a user interaction with a virtual control on the control interface; and communicating, from the companion device to the primary device, a control command consistent with the user interaction with the virtual control.

2. The method of claim 1, wherein the first media application is running in full screen mode on the primary device and the second media application is running in hidden mode on the primary device, and therefore the second media application does not have viewport visible on an interface generated by the primary device.

3. The method of claim 1, wherein the active-application interface is output automatically without user intervention upon formation of a data connection between the companion device and the primary device in response to detecting the data connection.

4. The method of claim 1, wherein the method further comprises receiving at the companion device an instruction to change the targeting of the control application from the second media application to the first media application.

5. The method of claim 1, wherein the method further comprises displaying on the active-application interface a description of a media content currently engaged by the second media application.

6. The method of claim 1, wherein the method further comprises:

determining that the second media application was closed on the primary device at a point in time when the targeting was on the second media application; and upon said determining, automatically resetting the targeting of the control application to a media application having a largest viewport on an interface generated by the primary device when the second media application was closed.

7. The method of claim 1, wherein the primary device is a game console and the companion device is selected from a group consisting of a tablet or a smartphone.

8. One or more computer storage media comprising computer-executable instructions embodied thereon that, when executed by a computing device, performs a method for using a control application on companion device to manipulate an application operating on a primary device, the method comprising:

determining that a plurality of media applications are running on the primary device, wherein the plurality of media applications comprise a first media application and a second media application, and wherein a targeting of the control application on the companion device is on the first media application;

determining that the first media application is engaged with a first media title; and outputting for display on the companion device an active-application interface that comprises an application identification portion that identifies media titles running on the primary device that can be controlled by the companion device through the control application and a media detail portion that identifies a media title engaged by an application the control application is targeting, wherein the application identification portion displays a first application indication identifying the first media application and a second application indication identifying the second media application, wherein the media detail portion identifies the first media title because the targeting is on the first media application.

9. The media of claim 8, wherein the first media application is displayed more prominently from the second media application indicating the targeting is on the first media application.

10. The media of claim 8, wherein the method further comprises receiving a state message from the primary device that identifies the plurality of media applications, including the first media application and the second media application, presently running on the primary device.

11. The media of claim 8, wherein an application is engaged with a media title when the media title is being played by the application.

12. The media of claim 8, wherein the method further comprises:
   in response to a user interaction, changing the targeting from the first application to the second application;
   in response to changing the targeting, changing the media portion to comprise an identification of a second media title engaged by the second application.

13. The media of claim 8, wherein active-application interface further comprises a media control adapted to control the first media application because the targeting is on the first media application.

14. The media of claim 8, wherein the active-application interface comprises a global control interface portion and an application specific portion, wherein the application identification portion and the media portion are displayed within the application specific portion and the global control interface portion comprises a global control trigger that opens a global control interface that includes a global virtual control for the primary device that is not application specific.

15. The media of claim 14, wherein the global virtual control is selected from a list consisting of audio control, power on, power off, and menu.

16. The media of claim 8, wherein the active-application interface comprises a play control portion and an application specific portion, wherein the application identification portion and the media portion are displayed within the application specific portion and the play control portion comprises a virtual control for an application that is being targeted by the control application.

17. The media of claim 16, wherein the virtual control is a media pause button.

18. A method for using a companion device to manipulate a graphical user interface generated by a control application operating on a primary device, the method comprising:
   at the primary device with a first media application running out-of-control focus and a second media application running in a control focus, receiving a control instruction from the companion device to manipulate the first media application; and
   manipulating the first media application in a manner consistent with the control instruction without interrupting the second media application and without interrupting a viewport generated by the second media application.

19. The media of claim 18, wherein the method further comprises receiving a control input from a dedicated controller for the primary device and manipulating the second media application according to the control input.

20. The media of claim 19, wherein the dedicated controller is a gamepad.

* * * * *